Patented Oct. 14, 1924.

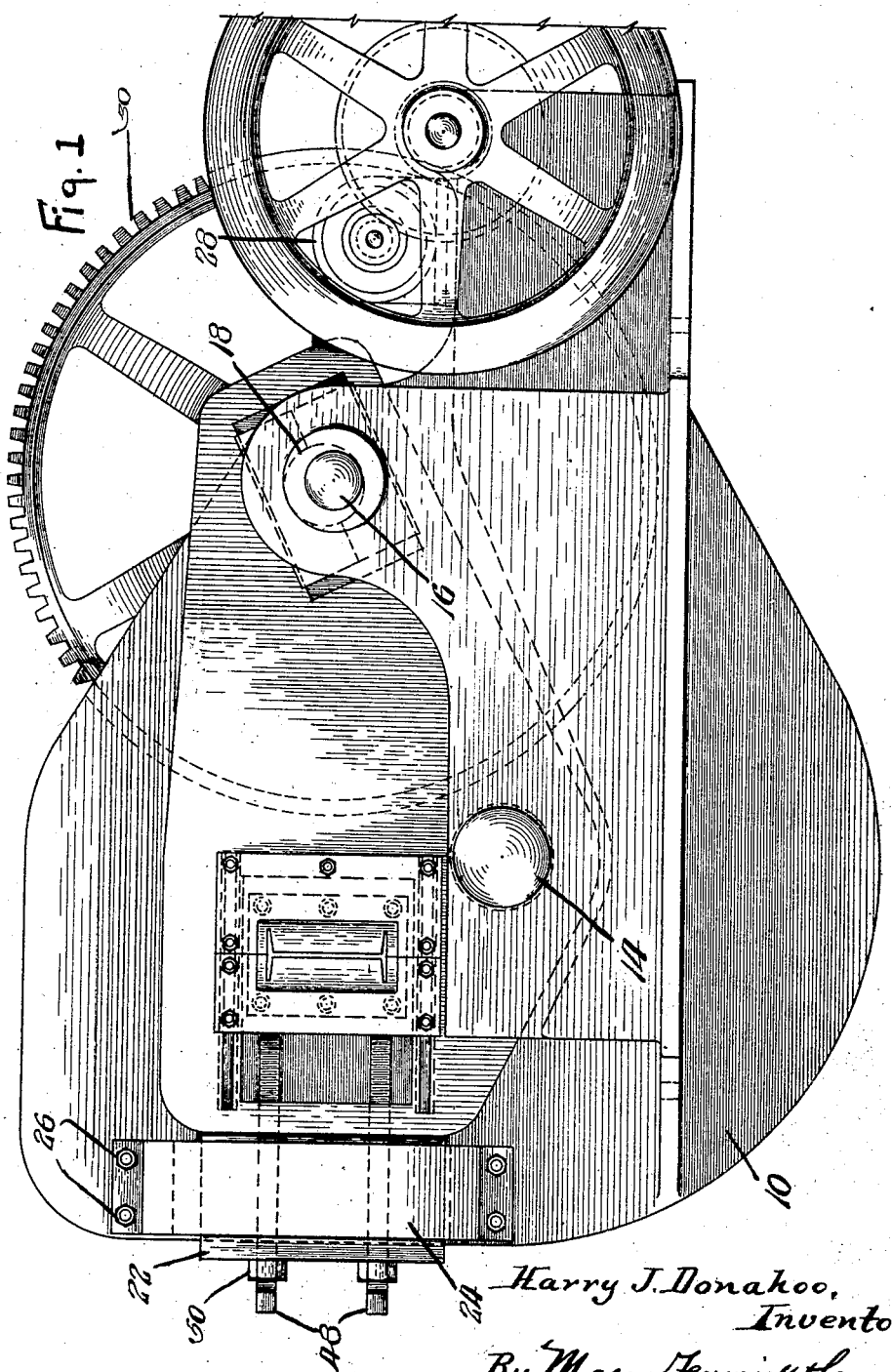

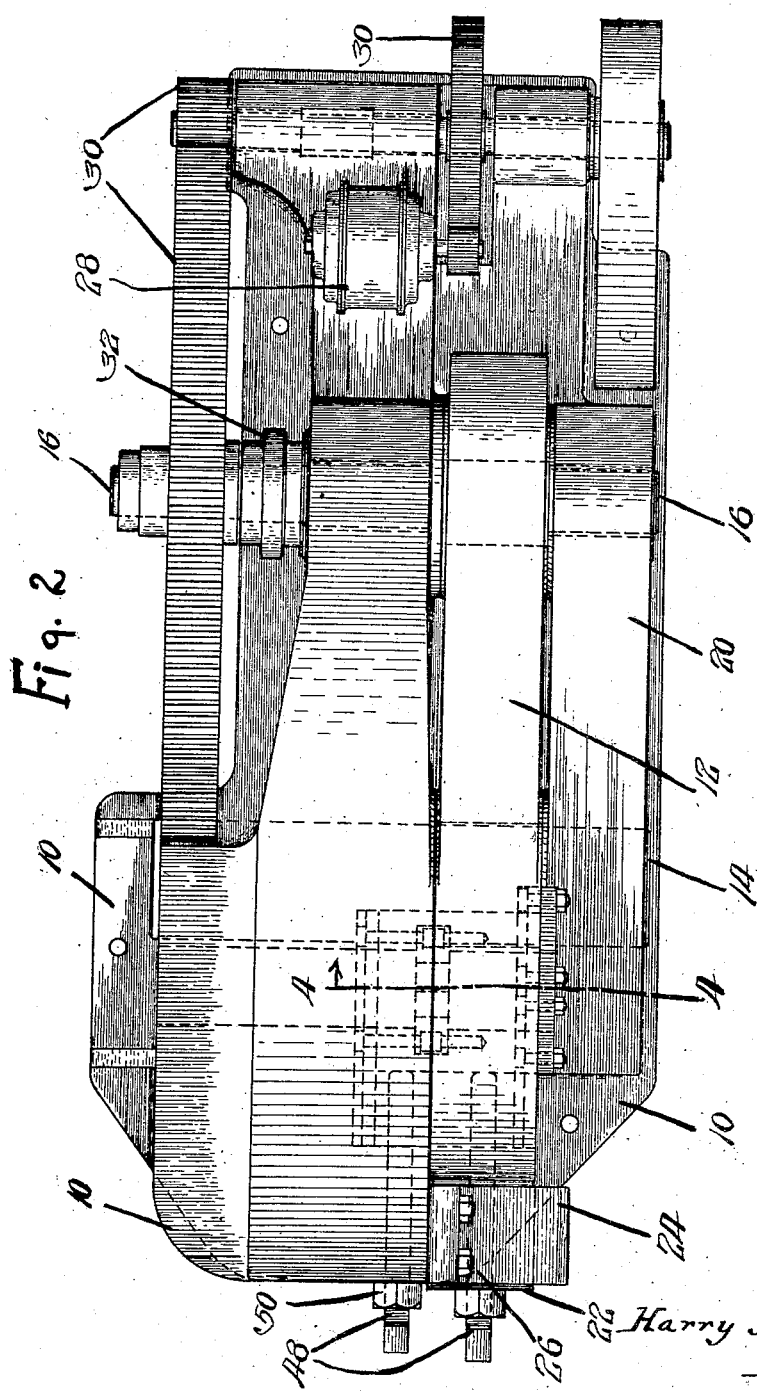

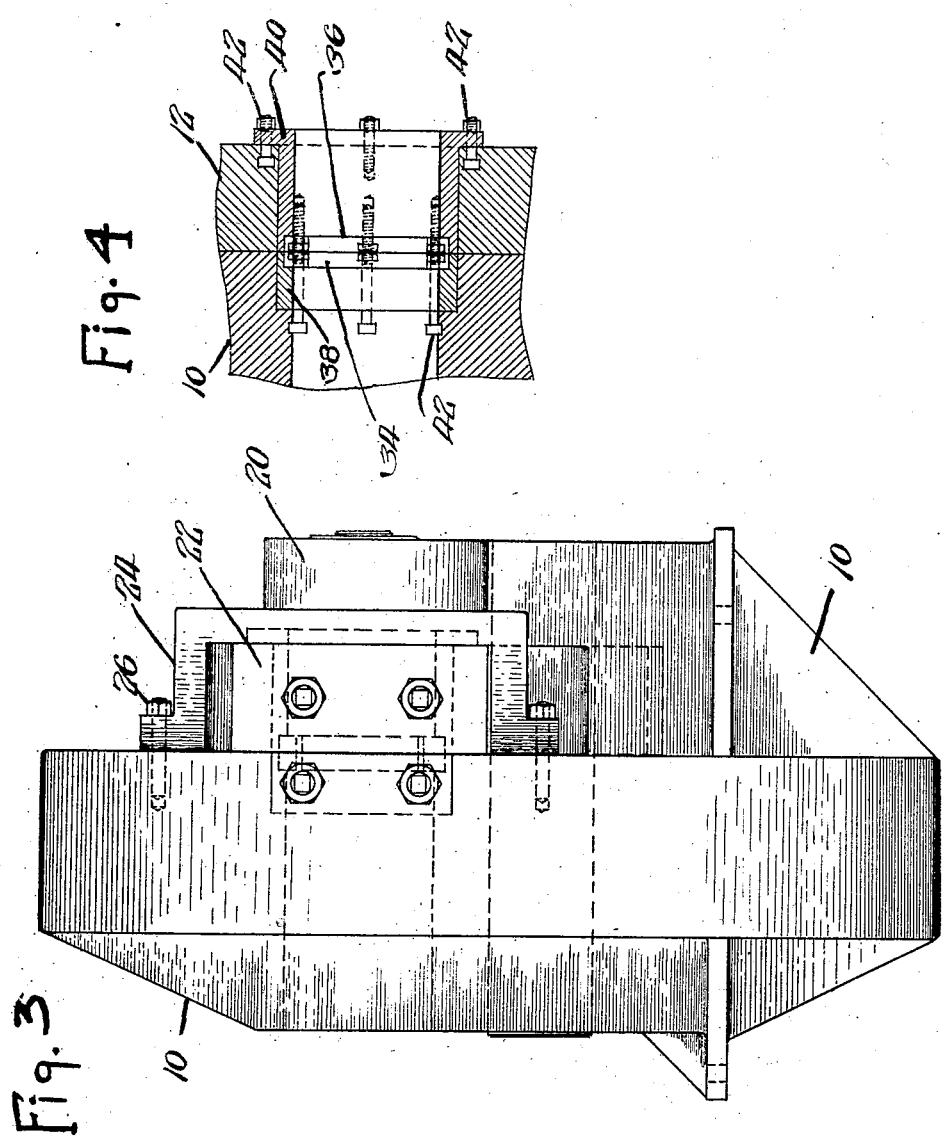

1,511,952

UNITED STATES PATENT OFFICE.

HARRY J. DONAHOO, OF MOLINE, ILLINOIS.

SHAPES SHEAR.

Application filed January 10, 1923. Serial No. 611,811.

*To all whom it may concern:*

Be it known that I, HARRY J. DONAHOO, a citizen of the United States, residing at 620 17th Street, Moline, in the county of Rock Island and State of Illinois, have invented certain new and useful Improvements in Shapes Shears; and I do hereby declare the following to be a full, clear, and exact description of the invention, such as will enable others skilled in the art to which it appertains to make and use the same.

This invention relates to improvements in shapes shears, and has for one of its principal objects the provision of a shearing machine for cutting metal articles of any shape, as I-beams, angle bars, channels, T bars, or any other shape.

One of the important objects of this invention is the provision of a shapes shear which shall be adapted to cut metallic beams, or other objects, with a minimum expenditure of power, and in a very efficient manner, and also in such a way that there will be no possibility of twisting, bending, or distorting the material being cut, especially at the edges or ends.

One of the important features of this invention is the provision of a shapes shear for metal beams, or other objects, which shall act to shear or cut the metal in a sort of sliding, diagonal, or raking stroke, whereby a shearing stress will be applied to the material at a plurality of points at the same time, and the sheared area is less than the entire cross sectional area of the material itself. This provides for a much more efficient manner of cutting the material, and results in a cleaner and surer cut with a minimum expenditure of power.

Still another important object of this invention is the provision of a shapes shear which shall be provided with removable cutting blades or dies, which cutting blades or dies can be readily removed and replaced when worn, or can be ground down and resharpened and replaced in the machine for further use, thereby affording a very considerable saving due to the replacement of these parts.

Another and further object of the invention is the provision of a shapes shear which will be provided with cutting blades adjustable to and from each other in both the fixed and movable cutting members, and which, in this manner, provides for a wide range of operation, and an ease of handling, no matter what the material being cut.

Other and further important objects of the invention will be apparent from the disclosures in the accompanying drawings and following specification.

The invention, in a preferred form, is illustrated in the drawings, and hereinafter more fully described.

In the drawings:

Figure 1 is a side elevation of the improved device of this invention.

Figure 2 is a top plan view of the same.

Figure 3 is an end view.

Figure 4 is a detail sectional view showing the method of applying the removable cutting blades or dies to the shearing members, and is taken on the line 4—4 of Figure 2.

As shown in the drawings:

The reference numeral 10 indicates generally the frame or base of the improved machine of this invention, which it is understood, is a particularly heavy block or casting of metal, the size of which will correspond to the strength and solidity required with respect to the particular beams or members which are adapted to be cut in the machine.

Adapted to cooperate with the fixed frame member 10 is a movable blade member 12, which operates as the cutting element. This movable member 12 is likewise composed of suitable heavy metal, and is pivoted about an axle 14, and securely mounted thereon, and moves between integral portions of the base or frame, as shown at 10 and 20.

Passing through a suitable opening in the rear end of the blade member 12 is a shaft 16, having an eccentrically mounted cam 18 thereon, as best shown in Figure 1 by the dotted lines. A portion of the frame member 20 is built around the outer side or face of the movable blade member 12, and is adapted to cooperate with and forms part of the original base or frame 10. The axles or shafts 14 and 16 pass through both portions 10 and 20, and moreover, this auxiliary frame member 20 also serves to hold the cutting blade member 12 securely in position against the face of the main member 10. Further, an extension or lug 22 is made integral with the movable blade member 12, and this lug 22 passes through a suitable bracket 24, fastened by means of bolts 26 to the side of the frame 10, whereby a close cooperation is insured between the inner face of the movable cutting member 12, and the corresponding face of the fixed frame member 10 at all times.

A motor 28 is provided for the suitable operation of the device, and this motor 28 acts through a series of gears 30 to rotate the shaft 16, which has the eccentric or cam 18 thereon. A single revolution clutch 32, of any suitable or preferred construction, is mounted on the shaft 16, whereby a single operation or revolution of the shaft 16 is provided for, and, as best illustrated in Figure 1, the shaft 16 will be so actuated upon by the clutch 32, that it will always come to rest at a point where the high point of the cam 18 is so positioned with respect to the movable cutting member 12 that the opening or spaces for the die members or cutting blades in the movable member 12 and the frame 10 respectively are always automatically aligned.

As best shown in Figures 3 and 4, a set of removable and adjustable cutting blades or dies 34 and 36 are positioned in the members 10 and 12 respectively. Sleeves 38 and 40 are also provided respectively for the proper maintenance in position of the cutting blades or die members 34 and 36. These sleeves 38 and 40 are held in position by means of bolts 42 or other suitable means, and, as best shown by the dotted lines in Figure 2, one set of each of the cooperating sleeves 38 and 40 is made adjustable laterally by having the same made slidable in suitable T-slots in the members 10 and 12 respectively. Proper adjustment of these movable members, and a secure locking of same in adjusted position is accomplished by means of bolts 48, which have their ends projecting beyond the end faces of the frame and blade members, and are fitted with lock nuts 50, as shown. It will be evident that by this construction a ready adjustment of the cutting dies 34 and 36 may be had to accommodate beams, channels, etc., of various sizes, and moreover, should the machine accidentally become stuck or jammed, the cutting parts can be easily removed, and breakage prevented.

The sleeves 38 and 40 are positioned in openings passing through the members 10 and 12, which openings are aligned at the time when the cam 18 is at its high point with respect to the motion of the movable blade member 12, the pivot 14 of which is positioned on a line extending at an angle of from 20° to 40° from a vertical line passing through the center of the openings just described. These angles have been found by experiment to be approximately the best angles at which the efficient cutting of any member in the dies could be accomplished.

As shown in the drawings, the die members or blades 36 are illustrated as forming a cutting member for an I-beam. Obviously these die members may be changed as to shape for cutting of various members, and also as to size, without departing from the spirit of the invention. Further, the same dies or cutting members 36 may obviously be used to cut other members than I-beams, as angle bars, T bars, channels or the like, which might be of the size to fit into the particular die members 36. The die or cutting members 34 and 36 are formed of tool steel, and therefore, may be readily ground down to be resharpened in the event of wear, and the sleeves 38 and 40 are of cast steel or any other suitable material. The cutting dies or blades 34 and 36 may be fastened to the sleeves 38 and 40 in any preferred manner, and as already explained, are adjustable.

It will be evident that in the operation of this device a shearing force will be exerted upon any material in the dies 36 and 34, which shearing force shall be upwardly and extending through an arc with the pivot point 14 as its center. Further, the downward tilting motion of the rear end of the movable member 12 will result in an increase of power, and a subsequent cutting or shearing action on the material in the dies which cannot be accomplished as well in any other manner. Again, it has been demonstrated that by positioning the central portion of the pivot point 14 on any line extending at an angle of from 20° to 40° from the center of the vertical line passing through the center of the openings in which the dies 34 and 36 are positioned, will result in an enormous increase in the cutting power, due to the fact that the shearing action takes place at quite a plurality of parts of the I-beam, angle bar, or T bar, or any other material in the dies.

It will further be evident that by the use of this construction a plurality of movable cutting members may be used, each acting about a common pivotal point, but operated on by eccentrics at different times, so that a double shearing action is accomplished. Also, a plurality of pivotal points may be used if desired, however, the construction shown in the drawings is preferred, as by this device the beam, or bar to be cut may be passed through the opening in the fixed base member 10, and the motion of the movable cutting member 12 is such that during the cutting only a slight tilting of the beam or bar results, and the bar may then be easily transferred to a rolling table or other conveying means after it has been cut, and absolutely no lifting motion is necessary upon the main end of the bar or beam from which the parts are being cut.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In a shapes shear, a frame, a cutting member movable with respect to the frame, removable cooperating cutting dies positioned in both the frame and the cutting member, a pivotal point upon which the movable member is positioned, whereby the dies in the movable member are adapted to be moved in an arc about said pivotal point, and means for accomplishing said arcuate movement of the dies, said means including a shaft passing through the frame and the movable cutting member, and an eccentric cam on said shaft adapted to cooperate with the cutting members.

2. In a shapes shear, a frame, a cutting member movable with respect to the frame, and removable adjustable cooperating cutting dies positioned in both the frame and the cutting member, each die having cutting edges adapted to closely surround the material to be cut, and a pivotal point upon which the movable member is positioned, whereby the dies in the movable member are adapted to be moved in an arc about said pivotal point, and means for accomplishing said arcuate movement of the dies, said means including a shaft passing through the frame and the movable cutting member, and an eccentric cam on said shaft adapted to cooperate with the cutting members.

3. In a shapes shear, a frame, a cutting member movable with respect to the frame, removable cooperating cutting dies positioned in both the frame and the cutting member, a pivotal point upon which the movable member is positioned, whereby the dies in the movable member are adapted to be moved in an arc about said pivotal point, means for accomplishing said arcuate movement of the dies, said means including a shaft passing through the frame and the movable cutting member, an eccentric cam on said shaft adapted to cooperate with the cutting member, and a single revolution clutch mounted on said cam shaft, whereby the dies in the fixed member and the movable member are automatically aligned at the end of each cutting operation.

4. In a shapes shear, a frame, a cutting member movable with respect to the frame, and removable cooperating cutting dies positioned in both the frame and the cutting member, each die having cutting edges adapted to closely surround the material to be cut, and a pivotal point upon which the movable member is positioned, said pivotal point being offset approximately 30°, whereby the dies in the movable member are adapted to be moved in an arc about said pivotal point, and means for accomplishing said arcuate movement of the dies, said means including a shaft passing through the frame and the movable cutting member, and an eccentric cam on said shaft adapted to cooperate with the cutting member, and a single revolution clutch mounted on said cam shaft whereby the dies in the fixed member and the movable member are automatically aligned at the end of each cutting operation.

In testimony whereof I affix my signature.

HARRY J. DONAHOO.